(12) United States Patent
Mitchell et al.

(10) Patent No.: US 8,365,607 B2
(45) Date of Patent: Feb. 5, 2013

(54) ANTI-SLIP GROOVES IN A CRIMPED PRESSURE SENSOR ASSEMBLY

(75) Inventors: Stephen E. Mitchell, Hope, RI (US); Juan P. Sanchez, Plainfield, CT (US)

(73) Assignee: Sensata Technologies, Inc., Attleboro, MA (US)

( * ) Notice: Subject to any disclaimer, the term of this patent is extended or adjusted under 35 U.S.C. 154(b) by 40 days.

(21) Appl. No.: 13/172,996

(22) Filed: Jun. 30, 2011

(65) Prior Publication Data

US 2013/0000413 A1    Jan. 3, 2013

(51) Int. Cl.
 *G01L 7/00*    (2006.01)
(52) U.S. Cl. .......................................................... 73/756
(58) Field of Classification Search ....................... 73/756
 See application file for complete search history.

(56) References Cited

U.S. PATENT DOCUMENTS

| | | | | |
|---|---|---|---|---|
| 4,875,135 A * | 10/1989 | Bishop et al. | ................ | 73/718 |
| 4,982,607 A * | 1/1991 | Betterton et al. | ............. | 73/725 |
| 5,822,173 A * | 10/1998 | Dague et al. | .................. | 73/718 |
| 5,827,972 A * | 10/1998 | Balcarek et al. | .............. | 73/756 |
| 5,880,372 A * | 3/1999 | Nasiri | ............................ | 73/726 |
| 5,902,933 A * | 5/1999 | Bingo et al. | .................. | 73/724 |
| 6,009,757 A * | 1/2000 | LeComte et al. | .............. | 73/724 |
| 6,055,864 A * | 5/2000 | Stiller et al. | .................... | 73/756 |
| 6,487,911 B1 * | 12/2002 | Frackelton et al. | ............ | 73/718 |
| 6,672,170 B1 * | 1/2004 | DiPaola | ......................... | 73/717 |
| 6,763,724 B2 * | 7/2004 | DiPaola et al. | ................. | 73/717 |
| 6,883,219 B2 * | 4/2005 | Kuroda et al. | ................. | 73/756 |
| 7,028,549 B2 * | 4/2006 | Wingsch | ........................ | 73/715 |
| 8,051,719 B2 * | 11/2011 | Bigliati et al. | ................. | 73/756 |
| 2010/0011871 A1 * | 1/2010 | Bigliati et al. | ................. | 73/756 |
| 2012/0011937 A1 * | 1/2012 | Bigliati et al. | ................. | 73/756 |
| 2012/0073381 A1 * | 3/2012 | Ashino | ......................... | 73/753 |

* cited by examiner

*Primary Examiner* — Lisa Caputo
*Assistant Examiner* — Punam Roy
(74) *Attorney, Agent, or Firm* — Chapin IP Law, LLC

(57) ABSTRACT

According to one configuration, a base component of a pressure sensor assembly includes a hollowed volume (e.g., chamber, bore, space, etc.) in which to house components such as a pressure sensor element and pressure sensor circuitry. Opposite an opening to the hollowed volume, the base component further includes a port through which to receive a fluid. An inside wall of the first end of the metallic base component includes grooves. The grooves can be created on the inner wall based on a metalworking operation known as broaching. To produce the pressure sensor assembly, at least a portion of the first end of the metallic base component including the grooves is crimped inward to fixedly couple a connector component to the metallic base component and retain the pressure sensor electronics and pressure sensor circuitry within the hollowed volume.

19 Claims, 10 Drawing Sheets

ANTI-SLIP GROOVES IN A CRIMPED PRESSURE SENSOR ASSEMBLY

BACKGROUND

Conventional sensor devices have been used to measure environmental conditions. For example, via signal information generated by a conventional pressure sensor device, it is possible to monitor and electrically convey pressure conditions to a remote location over a wired link. An example of a pressure sensor assembly is shown in U.S. Pat. No. 4,875,135 granted to Bishop.

One type of conventional pressure sensor assembly includes multiple components. For example, a conventional pressure sensor assembly can include a metal base component including threads in order to mount the pressure sensor assembly to a host device such as an engine block. The metal base component of the pressure sensor assembly can include a cup or hollowed region in which to house respective pressure sensor electronics and a pressure sensor element. The pressure sensor electronics in the pressure sensor assembly can be configured to receive a signal from the pressure sensor element (e.g., a capacitive sense element, resistive sense element, etc.). The pressure sensor element detects a pressure of a fluid received through a port of the metal base component. The signal transmitted from the pressure sensor element to the pressure sensor electronics varies depending on the sensed pressure of the fluid. In addition to the metal base component, a typical pressure sensor assembly can further include a connector component electrically coupled to the pressure sensor electronics. Typically, at least a portion of the connector component also can be fitted into the cup region of the pressure sensor assembly to hold and further protect the pressure sensor electronics in the cup from harmful environmental elements. A portion of the connector assembly opposite the portion in the cup can be exposed outside the cup to accept an end of a wire on which to convey the pressure information to a remote location.

Subsequent to processing the signal received from the pressure sensor element, the pressure sensor electronics typically produces an output signal transmitted through the connector of the pressure sensor assembly to a remote location.

During assembly of the conventional pressure sensor assembly, subsequent to insertion of the pressure sensor electronics, the connector component, and a portion of the connector assembly into the cup, a thin wall of the cup opposite the threads can be crimped over the portion of the connector assembly in the cup to prevent removal of the connector component from the pressure sensor assembly. Subsequent to crimping, the connector component firmly holds the pressure sensor electronics in the cup.

As mentioned, during operation, the pressure sensor electronics in the cup of the metal base component generates a respective signal indicative of the sensed pressure. The pressure sensor electronics transmits the pressure information through wiring in the connector component to the remote location.

BRIEF DESCRIPTION

There are deficiencies associated with the conventional pressure sensor assembly as discussed above. For example, inward crimping of the thin wall of the cup in the base component over the portion of the connector assembly prevents removal of the connector component and pressure sensor electronics from the pressure sensor assembly. However, mere inward crimping of the thin, smooth wall over the portion of the connector component provides limited prevention of rotation of the connector component with respect to the metal base component during a process such as installation or removal of the pressure sensor assembly. That is, when removing or inserting threads of the metal base component of the pressure sensor assembly into an engine block or other host, a mechanic may apply a rotational force to the connector component (as opposed to the metal base component) of the pressure sensor assembly by hand to at least partially screw or unscrew the pressure sensor assembly from the engine block. This rotational force applied to the connector component can cause the connector component in the pressure sensor assembly to rotate with respect to the metal base of the pressure sensor assembly, resulting in damage to the pressure sensor assembly. Accordingly, conventional pressure sensor assemblies are susceptible to damage during installation or removal.

Embodiments herein deviate with respect to conventional pressure sensor assemblies. For example, in contrast to conventional systems, certain embodiments herein are directed to reducing and/or preventing rotation of the connector component and the metal base component.

More specifically, in one embodiment, a pressure sensor assembly comprises: a pressure sensor element, pressure sensor circuitry, a metal base component, and a connector component. The pressure sensor element is configured to measure pressure of a fluid. The pressure sensor circuitry is coupled to the pressure sensor element to convert the pressure sensed by the pressure sensor element into an electronic signal. The connector component of the pressure sensor assembly conveys the electronic signal from the pressure sensor circuitry to an external resource.

In accordance with one embodiment, the metal base component of the pressure sensor assembly includes a hollowed volume (e.g., chamber, bore, space, etc.) at a first end in which to house the pressure sensor element and the pressure sensor circuitry. The metal base component further includes a port (e.g., a drilled or hollowed volume) at a second end through which to receive the fluid. An inside wall of the first end of the metal base component includes grooves. At least a portion of the first end of the metal base component such as a crimpable wall including the grooves is crimped inward to fixedly couple the connector component to the metal base component and retain the pressure sensor electronics and pressure sensor circuitry within the hollowed volume.

In accordance with further embodiments, the grooves on the inside wall of the metal base component substantially prevents rotation of the connector component with respect to the metal base component.

More specifically, the second end of the metal base component can include threads to screwably attach threads disposed at the second end of the metal base component into a host. Prior to being crimped inward to secure the connector component to the metal base component, the grooves on the inside wall at the first end of the metal base component can be parallel to an axis of rotation used to screw the metal base component into the host. Again, inward crimping of the grooves on the hollowed inside wall of the metal base component can prevent rotation of the connector component with respect to the metal base component. For example, in one embodiment, the grooves on the crimped wall can be substantially orthogonal with respect to a direction of a rotational force that is applied to the connector component to screw threads of the base component into a respective receptacle.

The pressure sensor circuitry as discussed herein can include conductive material coupled to and extending from the pressure sensor circuitry. For example, in one embodiment, the conductive material (e.g., wire, tab, metal foil, etc.) contacts at least a portion of the grooves on the crimped inside wall of the metal base component. In one embodiment, the conductive material electrically connects at least one node of the pressure sensor electronics to the metal base component.

The opening and respective inside wall at the first end of the metal base component can be circular or any other suitable shape.

A thickness of the crimped portion of the first end including the grooves can be between 0.05 millimeters and 2 millimeters, although the thickness can be any suitable value depending on the embodiment. A depth of each of the grooves on the inside wall of the metal base component can be between 2 and 8 millimeters, although the depth can be any suitable value depending on the embodiment. The inside surface of the crimpable wall can include any number of suitable grooves such as one to more than many thousand.

As previously mentioned, prior to crimping, the grooves on the inner wall of the metal base component at the opening can be aligned substantially parallel to an insertion axis of the pressure sensor assembly. Rotation of the pressure sensor assembly about the insertion axis screws threads of the metal base component into a host device such as an engine block or other threaded receptacle.

In one embodiment, the inward crimping of the first end of the metal base component (including inwardly crimping of the grooves on the inner wall) causes at least axial ends of the grooves and the inner wall to point substantially inward towards a center axis of the pressure sensor assembly. For example, subsequent to crimping, at least a portion of the grooved surface on the inwardly crimped inside wall of the metal base component applies a force on a rim of the connector component to secure the connector component to the metal base component.

In accordance with further embodiments, the pressure sensor assembly can include a seal. The seal, disposed in the hollowed volume of the metal base component, produces an airtight (i.e., fluid tight) seal between the pressure sensor element and the metal base component based on the force of the grooved surface on the rim of the connector component.

Another embodiment in the present disclosure is directed to the base component, which is made from a malleable material such as metal. As mentioned, the metal base component can include a first end and a second end. The first end includes an opening and hollowed volume or chamber in which to insert and house a sensor element. As mentioned, an inside wall at the opening of the hollowed volume can include a crimpable wall having grooves on the inner surface. The second end of the metal base component can include threads to screwably attach the metal base component to a host such as an engine block or other suitable resource. In one embodiment, the grooves are formed substantially parallel to an axis of rotation to screw the threads of the metal base component into the host. Again, inward crimping of the grooved surface on the inside wall of the opening to apply a force to the connector component prevents rotation of a connector component with respect to the metal base component.

Embodiments herein further include a method of manufacturing or producing the pressure sensor assembly or metal base component. For example, in one embodiment, an assembler receives a metal base component including a first end and a second end. The first end of the metal base component includes an opening and hollowed volume. An inside surface of a crimpable wall at the opening of the hollowed volume has a grooved surface. The second end of the metal base component includes threads in which to screwably attach the metal base component to a threaded receptacle. The assembler inserts a sensor element in the hollowed volume. The assembler then inserts at least a portion of a connector component into the hollowed volume. The assembler then crimps the crimpable wall at the opening to fixedly secure the connector component to the metal base component and to retain the sensor element within the hollowed volume.

As previously discussed, crimping of the crimpable wall at the opening can cause axial ends of grooves in the grooved surface to point substantially inward towards a rotational axis of the metal base component. In one embodiment, the grooves on the crimped inner surface at the opening prevent rotation of the connector component with respect to the metal base component such that a mechanic is able to apply a torque to the connector component to screw threads of the metal base component into a complementary threaded receptacle.

These and other embodiment variations are discussed in more detail below.

As mentioned above, note that embodiments herein can include a configuration of one or more computerized devices, hardware processor devices, assemblers, or the like to carry out and/or support any or all of the method operations disclosed herein. In other words, one or more computerized devices, processors, digital signal processors, assemblers, etc., can be programmed and/or configured to perform the method as discussed herein.

Additionally, although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a base component of a pressure sensor assembly includes a hollowed volume (e.g., chamber, bore, space, etc.) in which to house components such as a pressure sensor element and pressure sensor circuitry. Opposite an opening to the hollowed volume, the base component further includes a port through which to receive a fluid. An inside wall or surface of the first end of the metallic base component includes grooves. The grooves can be created on the inner wall based on any suitable metalworking operation such as broaching. To produce the pressure sensor assembly, at least a portion of the first end of the metallic base component including the grooves is crimped inward to fixedly couple a connector component to the metallic base component and retain the pressure sensor electronics and pressure sensor circuitry within the hollowed volume.

Figure 1:
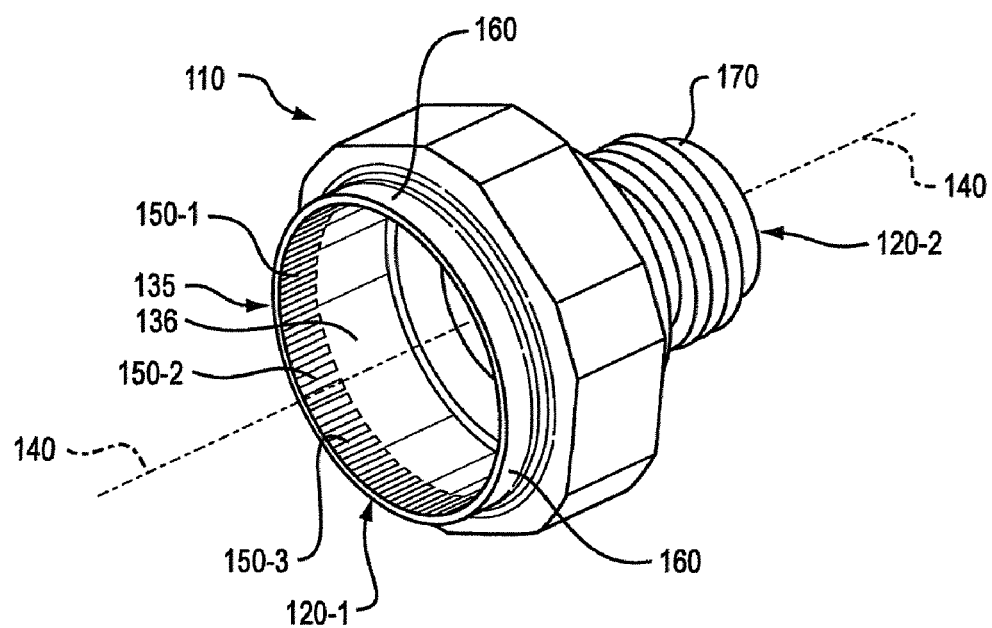
FIG. 1 is an example perspective view of a base component of a pressure sensor assembly according to embodiments herein.

FIG. 1 is an example perspective view of a base component of a pressure sensor assembly according to embodiments herein.

One embodiment of the present disclosure is directed to a base component 110. The base component 110 can be made of any suitable material such as brass, copper, alloy, moldable plastic, etc. In one embodiment, the base component 110 is milled out of metal such as brass, aluminum, copper, etc.

As shown, base component 110 can include a hex or other suitable pattern to enable application of torque via a wrench.

The base component 110 includes a first end 120-1 and a second end 120-2. The first end 120-1 of base component 110 includes an opening 135 and hollowed volume 136 (e.g., a chamber, space, etc.) in which to insert and house components such as a sensor element, circuitry, etc.

The opening 135 of the hollowed volume 136 includes a crimpable wall 160 (e.g., a wall capable of being crimped as discussed later in this specification) having grooves 150 (e.g., groove 150-1, groove 150-2, groove 150-3, etc.) on a respective inner surface of inwardly crimpable wall 160. The grooves 150 can be created on the inner surface of crimpable wall 160 based on any suitable metalworking operation such as broaching, etching, etc.

The second end 120-2 of the base component 110 can include threads 170 to screwably attach the base component 110 to a host such as a threaded receptacle or other connection method.

In one embodiment, the grooves 150 are formed substantially parallel to an axis 140 of rotation to screw the threads 170 of the (metallic) base component 110 into the host.

As will be discussed later in this specification, inward crimping of the crimpable wall 160 and respective grooved surface on the inside wall of the opening 135 to secure a connector component prevents rotation (about axis 140) of a respective connector component with respect to the base component 110.

As shown, the opening 135 and respective crimpable wall 160 at the first end 120-1 of the base component 110. However, the crimpable wall 160 can be circular or any other suitable shape.

Figure 2:
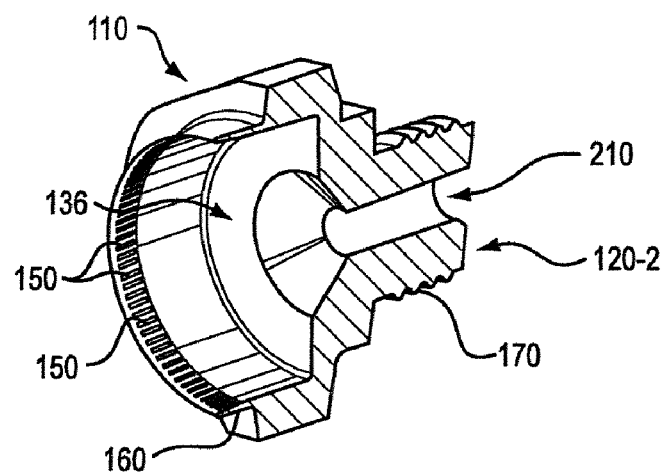
FIG. 2 is an example cutaway perspective view of a base component of a pressure sensor assembly according to embodiments herein.

FIG. 2 is an example cutaway perspective view of a base component of a pressure sensor assembly according to embodiments herein.

As shown, the second end 120-2 of the base component 110 can further include a port 210. The port 210 enables a pressure sensor circuitry and pressure sensor element in the hollowed volume 136 to detect a respective pressure of a fluid (e.g., liquid or gas) in or received by the port 210.

Figure 3:
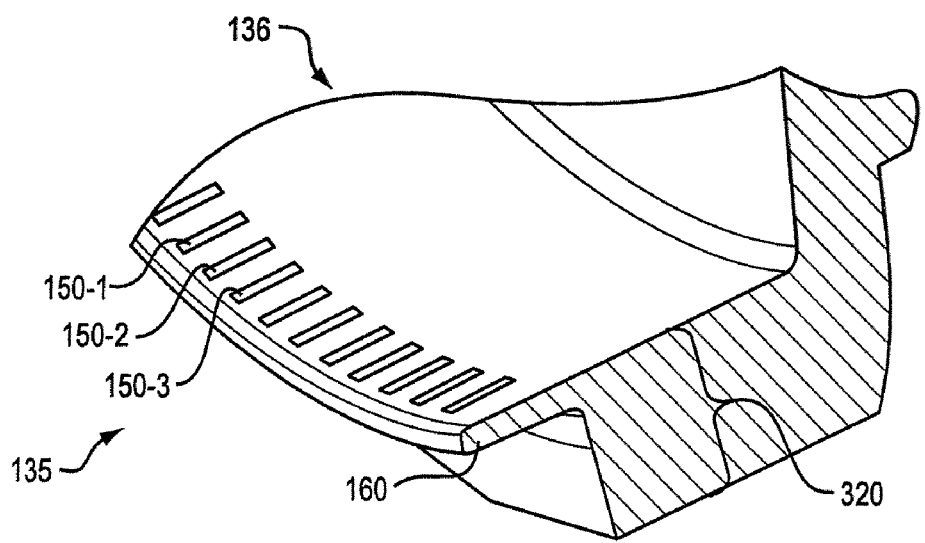
FIG. 3 is an example cutaway perspective view of a base component of a pressure sensor assembly according to embodiments herein.

FIG. 3 is an example cutaway perspective, close-up view of a base component of a pressure sensor assembly according to embodiments herein.

As shown, the crimpable wall 160 disposed at the opening 135 can include multiple grooves 150. In one embodiment, the grooves 150 are substantially orthogonal to a force or torque need to screw threads 170 of the base component 110 into a respective threaded receptacle.

Figure 4A:
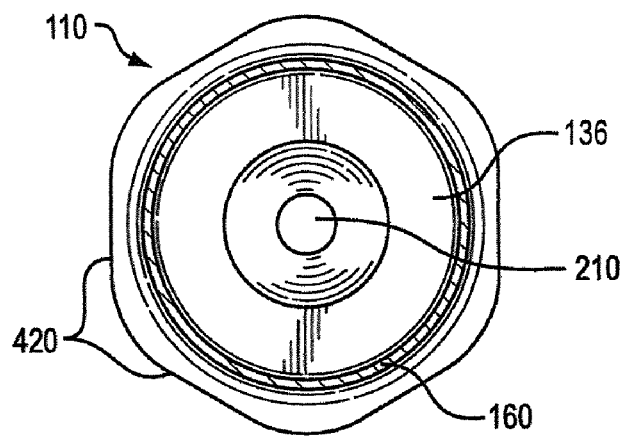
FIG. 4A is an example view of a base component of a pressure sensor assembly as viewed along a rotational axis according to embodiments herein.

FIG. 4A is an example view of the base component as viewed along a rotational axis 140 of the base component according to embodiments herein. As shown, the base component 110 can include a hex bolt-like pattern 420 to enable application of torque via wrench or other suitable tool.

Figure 4B:
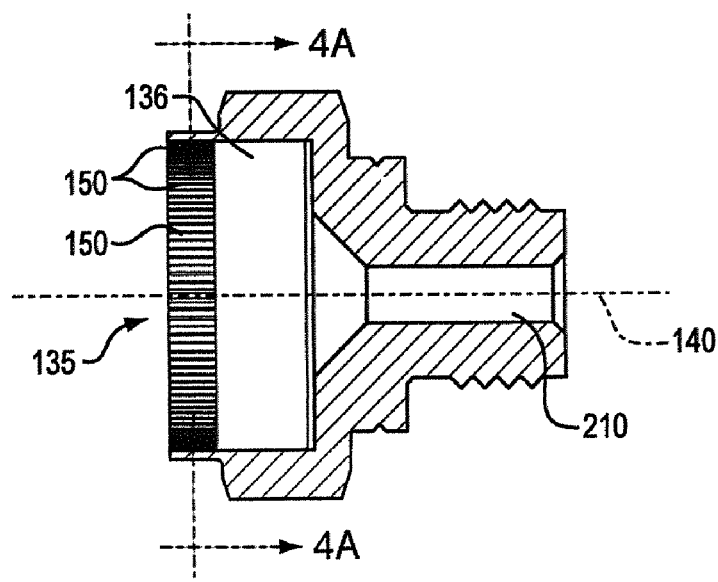
FIG. 4B is an example side view of a base component of a pressure sensor assembly according to embodiments herein.

FIG. 4B is an example cutaway side view of the base component according to embodiments herein. As shown, grooves 150 are substantially parallel to, but offset with respect to with respect to axis 140.

Figure 5:
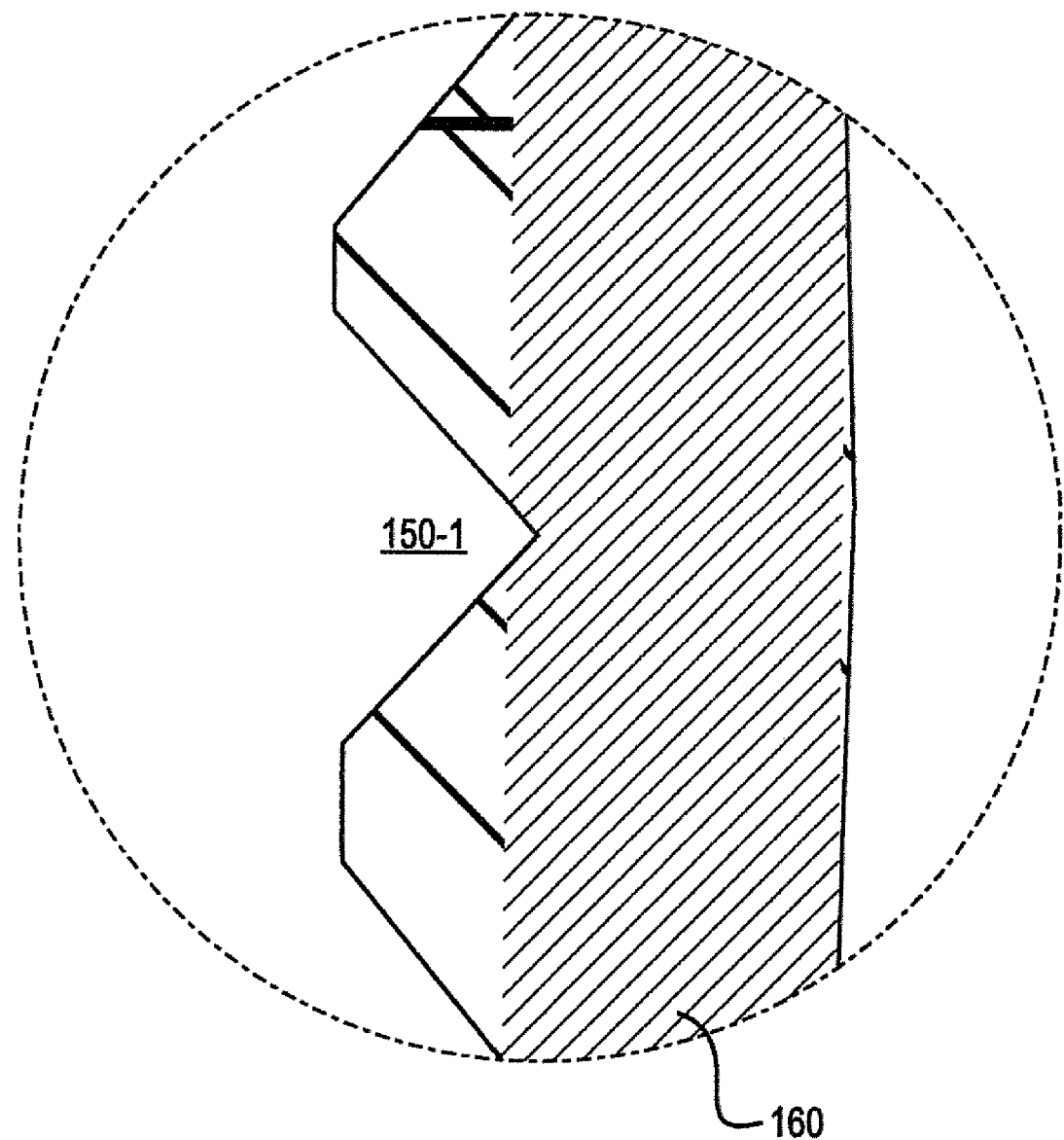
FIG. 5 is an example side view diagram illustrating grooves on an inner wall of a base component according to embodiments herein.

FIG. 5 is an example diagram illustrating a side view (along axis 140) of grooves on an inner circumferential wall of the base component according to embodiments herein.

As shown, and as previously discussed, the groove 150-1 (as well as other grooves) are formed in the crimpable wall 160. To create the grooves, portions of the crimpable wall 160 can be etched, broached, etc., to remove material.

In accordance with further embodiments, note that the grooves 150 can be formed via addition of appropriate material to the inner surface of crimpable wall 160. For example, in lieu of removing a portion of the crimpable wall to create grooves 150, grooves can be formed via bumps or raised regions on the crimpable wall 160.

Figure 6:
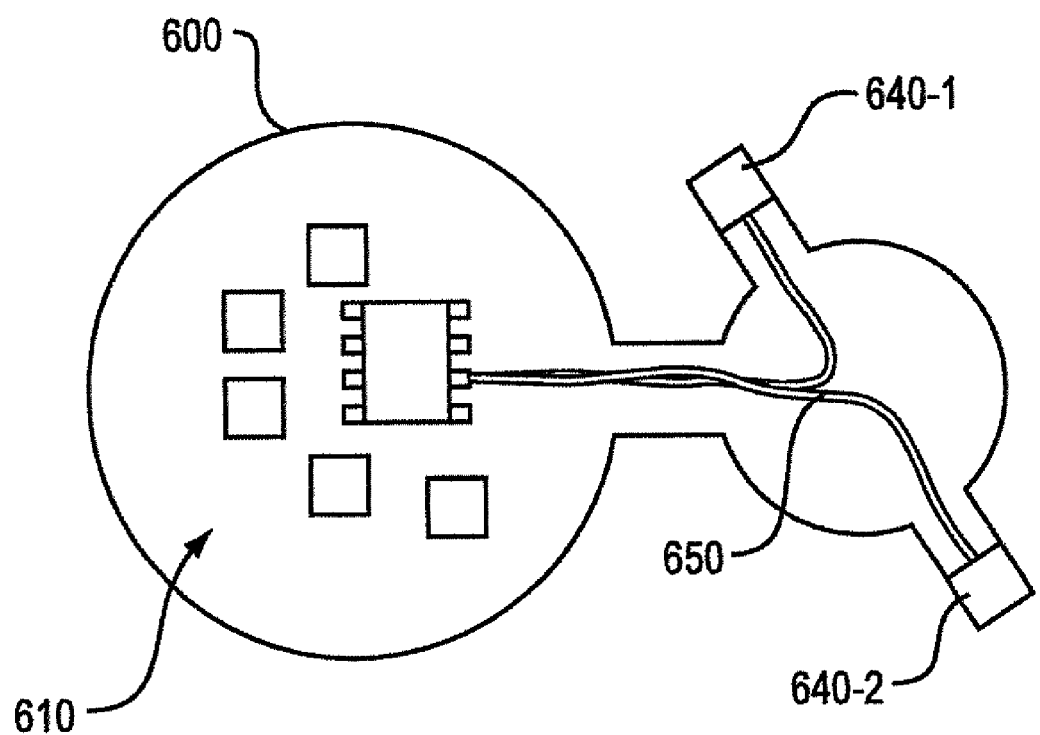
FIG. 6 is an example diagram illustrating pressure sensor circuitry disposed on a circuit substrate according to embodiments herein.

FIG. 6 is an example diagram illustrating pressure sensor circuitry disposed on a circuit substrate according to embodiments herein. In one embodiment, the circuit substrate 600 is flexible. The circuit substrate 600 can be populated with respective pressure sensor circuitry 610.

In accordance with further embodiments, the pressure sensor circuitry 610 and/or respective substrate 600 can include one or more conductive tabs 640 (e.g., conductive tab 640-1, 640-2, . . . ). As will be discussed later in this specification, one or more conductive tabs 640 can provide a conductive path 650 between base component 110 (e.g., via contact with grooves 150) and pressure sensor circuitry 610.

Figure 7:
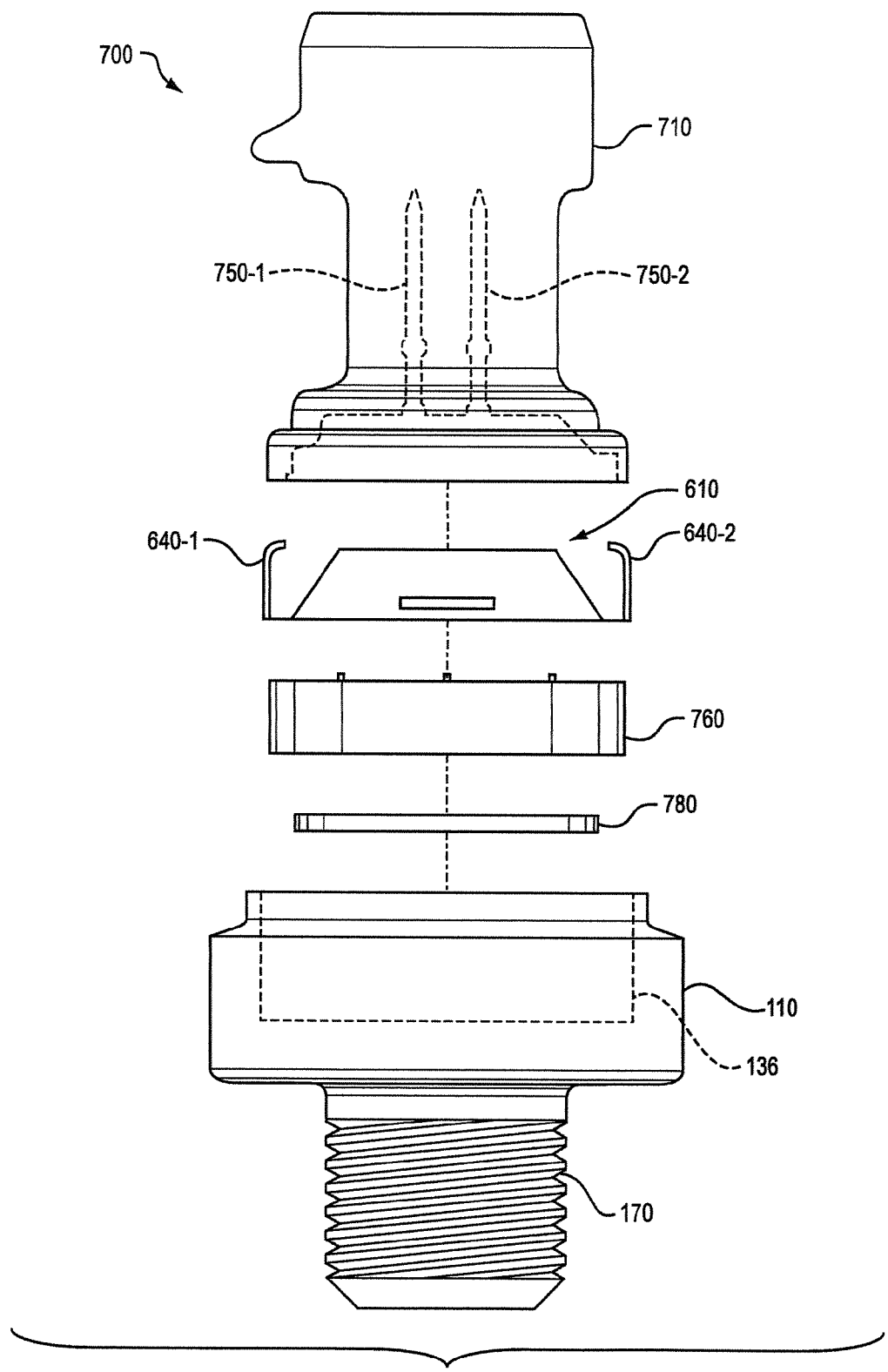
FIG. 7 is an example diagram illustrating an exploded view of components in a pressure sensor assembly according to embodiments herein.

FIG. 7 is an example diagram illustrating an exploded view of components in a pressure sensor assembly according to embodiments herein. As shown by way of a non-limiting example, pressure sensor assembly 700 includes connector component 710, pressure sensor circuitry 610, pressure sensor element 760 (e.g., a capacitive pressure sensor element, a resistive pressure sensor element, etc.), sealing ring 780, and base component 110. Connector component 710 can be made from an insulation-type of material such as plastic, ceramic, etc.

The pressure sensor element and pressure sensor circuitry as discussed herein can provide a number of different functions. For example, in one embodiment, the pressure sensor element detects a magnitude of pressure in port 210.

Connector component 710 includes one or more pins 750 (e.g., pin 750-1, pin 750-2, etc.) on which to convey an electrical signal. As previously discussed, pressure sensor circuitry 610 can include conductive tabs 640.

Figure 8:
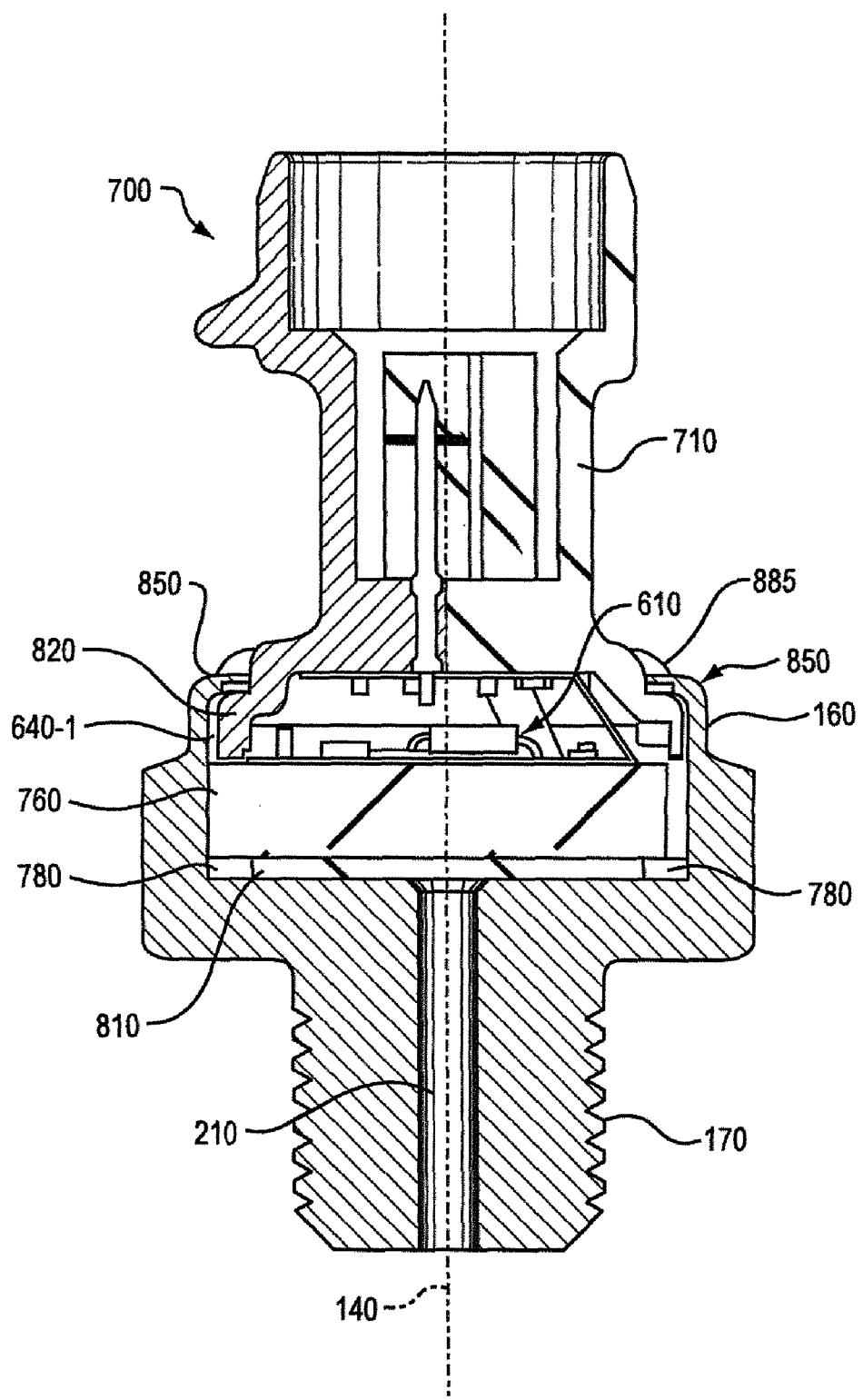
FIG. 8 is an example diagram illustrating a cutaway view of an assembled pressure sensor assembly according to embodiments herein.

FIG. 8 is an example diagram illustrating a cutaway view of an assembled pressure sensor assembly according to embodiments herein. As shown, sealing ring 780, pressure sensor element 760, pressure sensor circuitry 610, and a portion of connector component 710 reside in hollowed volume 136.

The pressure sensor element 760 measures pressure of a fluid received through port 210.

For example, in one embodiment, the pressure sensor circuitry 610 is electrically coupled to the pressure sensor element 760 to convert the pressure sensed by the pressure sensor element 760 into an electronic signal conveyed or transmitted through one or more pins 750 of connector component 710. Thus, the connector component 710 of the pressure sensor assembly 700 conveys the electronic signal from the pressure sensor circuitry 610 to an external resource.

In accordance with another embodiment, the pressure sensor circuitry 610 includes a switch device. In such an embodiment, the pressure sensor circuitry 610 is electrically coupled to the pressure sensor element 760 to monitor the pressure sensed by the pressure sensor element 760. Depending on the magnitude of the sensed pressure, the pressure sensor circuitry controls the state of a switch device in the pressure sensor circuitry 610. Terminals of the switch device can be coupled through conductors in the connector such that a remote location can detect a state of the switch device.

As mentioned, the (metal-based) base component 110 includes a hollowed volume 136 (e.g., chamber, bore, space, etc.) at a first end 120-1 in which to house at least the pressure sensor element 760 and the pressure sensor circuitry 610. The base component 110 further includes port 210 at a second end 120-2 through which to receive and monitor a pressure of a fluid.

As previously discussed, an inside of the crimpable wall 160 of the base component 110 includes grooves 150. At least a portion of the crimpable wall 160 including the grooves 150 is crimped inward to fixedly couple the rim 820 of the connector component 710 to the base component 110 and retain the pressure sensor circuit 610 (e.g., electronics, circuit substrate, etc.) and pressure sensor element 760 within the hollowed volume 136. By way of a non-limiting example, the grooves 150 on the inside of crimpable wall 160 substantially prevent rotation of the connector component 710 and other components with respect to the (metallic) base component 110.

As mentioned, the base component 110 can include threads 170 to screwably attach the base component 110 into a host or mating resource. Prior to being crimped inward to secure the connector component 710 to the base component 110, the grooves 150 on the inside of crimpable wall 160 of the base component 110 are formed parallel to an axis 140 of rotation used to screw the base component 110 into a host.

As previously discussed, the pressure sensor circuitry 610 can include conductive material such as conductive tabs 640-1 extending from the pressure sensor circuitry. When crimped, each of the conductive tabs 640 (e.g., material such as wire, metal foil, etc.) contacts at least a portion of the grooves 150 on the inside of crimpable wall 160. In one embodiment, the conductive tabs 640 electrically connect one or more nodes of the pressure sensor circuit 610 to the base component. Accordingly, when the base component 110 is screwed into a host, the pressure sensor circuitry 760 can be electrically coupled to the host (e.g., a metal threaded receptacle) through a path including the base component 110 and conductive tabs 740.

By way of a non-limiting example, a thickness of the crimped portion of the crimpable wall at the first end including the grooves 150 can be between 0.05 millimeters and 2 millimeters, although embodiments herein include producing the crimpable wall 160 to be of any suitable thickness.

By way of a further non-limiting example, a depth of each of the grooves on the inside wall of the metallic base component can be between 2 and 8 millimeters long (e.g., parallel to axis 140), although embodiments herein include producing the grooves 150 to be of any suitable depth and length.

Depending on the embodiment, the base component 110 can include such as few as one or more grooves to more than many thousands of grooves 150.

As previously mentioned, prior to crimping, the grooves 150 on the inner surface of crimpable wall 160 can be aligned substantially parallel to an insertion axis 140 of the pressure sensor assembly 700. Rotation of the pressure sensor assembly 700 about the insertion axis 140 can be performed to screw threads 170 of the base component 110 into a host device.

In one embodiment, the inward crimping of the first end 120-1 (and more particularly the crimpable wall 160) of the base component 110 (including inwardly crimping of the grooves 150 on the inner wall) causes axial ends of the grooves and the crimpable wall 160 to point substantially inward towards a center axis (e.g., axis 140) of the pressure sensor assembly 700. Subsequent to crimping, the crimp 850 and at least a portion of the grooves on the inner surface of the crimpable wall 160 applies a force on a rim 820 of the connector component 710 to secure the connector component 710 to the base component 110.

As mentioned, the pressure sensor assembly 700 can include a sealing ring 780 (e.g., a seal made of deformable material such as rubber, plastic, etc.). The sealing ring 780, disposed in the hollowed volume 136, produces an fluid tight seal between the pressure sensor element 760 and the base component 110 based on the force of the grooved surface and crimp 850 on the rim 820 of the connector component 710.

For example, when crimped, the crimpable wall 160 and respective grooves 150 apply a force substantially parallel to axis 140 to sandwich the conductive tabs 640 between the rim 820 and the crimpable wall 160. Grooves 150 on the smooth inner surface of the crimpable wall 160 sink into and deform the surface of conductive tabs 640 and/or connector component 710 due to the crimping force.

For example, in one embodiment, the crimping force associated with crimp 850 causes at least a portion of the material on the rim 820 of the connector component 710 to reside or occupy the open spaces forming the grooves 150.

In accordance with another embodiment, the crimping force associated with crimp 850 causes at least a portion of the material on the conductive tabs 640 rim 820 to reside or occupy the open spaces forming the grooves 150.

Additionally, note that the crimp 820 applies a force on rim 820; rim 820 applies a force on the pressure sensor element 760; pressure sensor element applies a force on sealing ring 780 to produce a fluid tight seal such that fluid received in port 210 is exposed only to a bottom surface (nearer the port 210) of pressure sensor element 760.

Note that bead 885 of material such as silicone, glue, etc., can be applied around an entire circumference between the connector component 710 and the crimpable wall 160 to form a second seal, preventing liquid, water, air or matter from entering the hollowed volume 136 subsequent to crimping.

Figure 9:
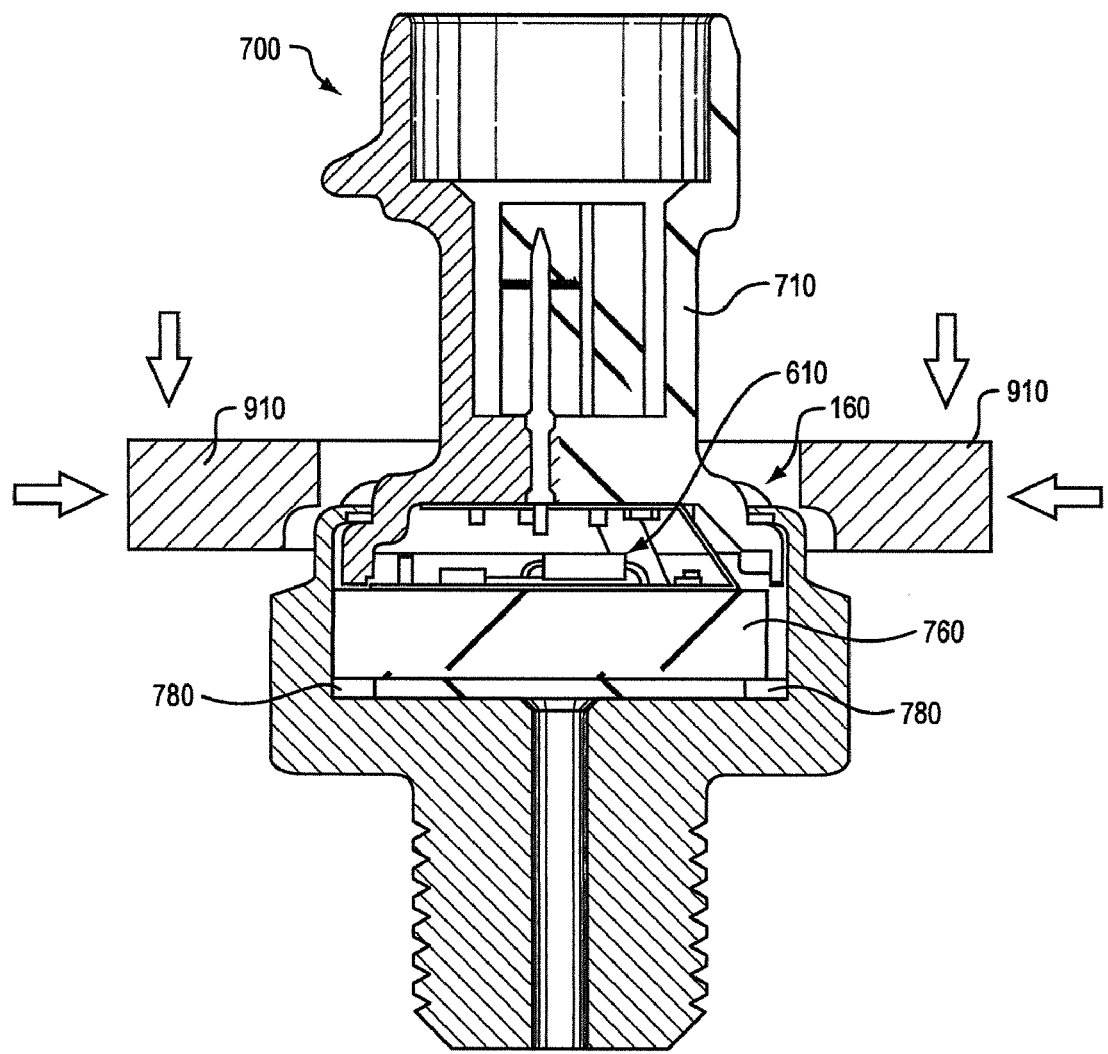
FIG. 9 is an example diagram illustrating a technique of crimping an end of a base component according to embodiments herein.

FIG. 9 is an example diagram illustrating a technique of crimping an end of a base component according to embodiments herein.

As shown, subsequent to inserting the sealing ring 780, pressure sensor element 760, pressure sensor circuitry 610, and portion of connector component 710 into the opening 135, the crimping press 910 applies an inward and/or downward force against the crimpable wall 160 to crimp the crimpable wall and respective grooves 150 inward as shown.

Figure 10:
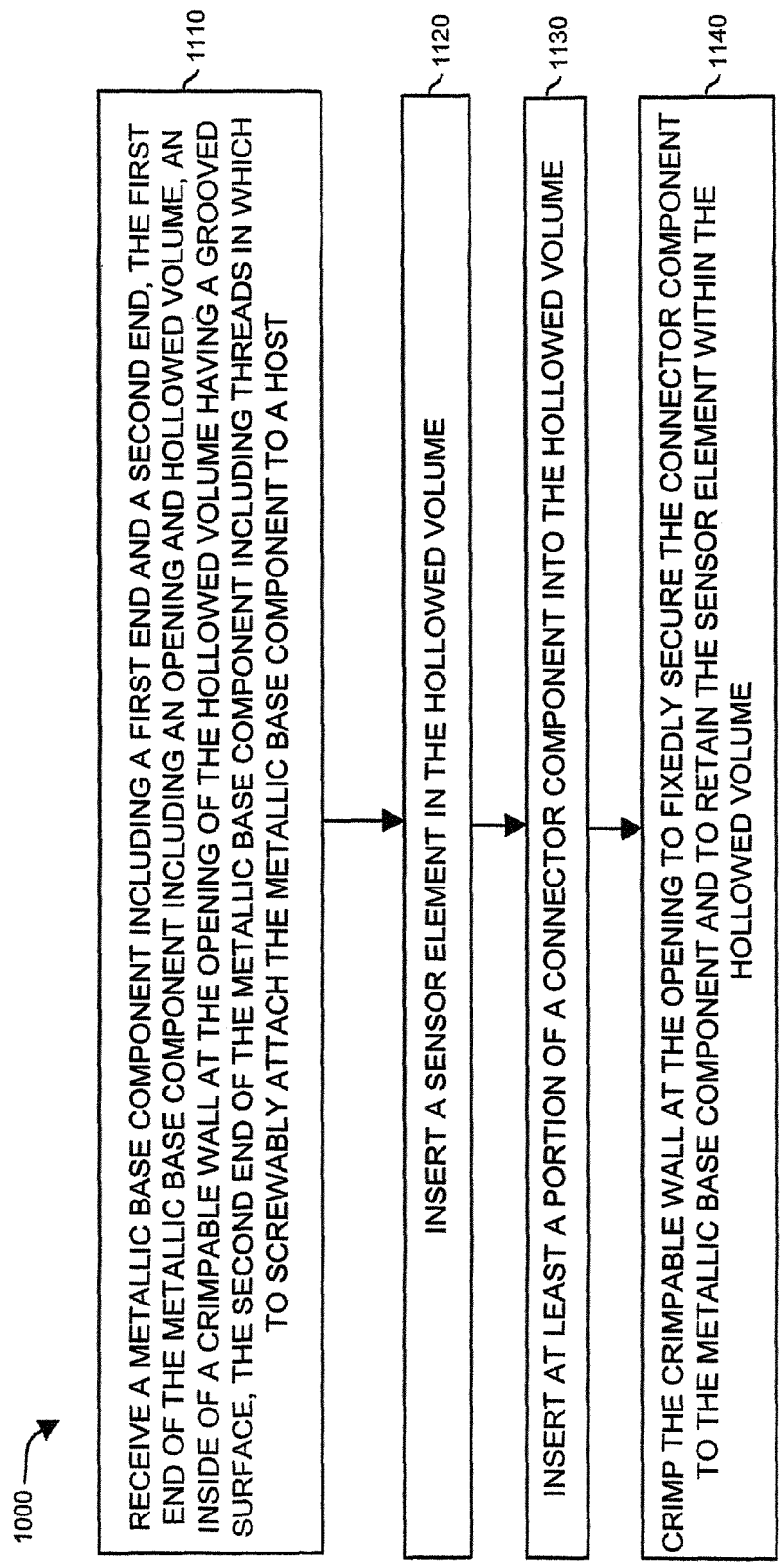
FIG. 10 is an example diagram illustrating a method of assembling a pressure sensor assembly using a metal base component according to embodiments herein.

FIG. 10 is an example diagram illustrating a method of assembling a pressure sensor assembly using a metallic base component according to embodiments herein.

In step 1110, an assembler receives a base component 110. The base component 110 includes a first end 120-1 and a second end 120-2. The first end 120-1 of the base component 110 includes an opening 135 and hollowed volume 136. The inside of the crimpable wall 160 at the opening 135 of the hollowed volume 136 has a grooved surface including grooves 150. The second end 120-2 of the base component 110 includes threads 170 in which to screwably attach the base component 110 into a host.

In step 1120, the assembler inserts a pressure sensor element 760 into the hollowed volume 136 over a sealing ring 780. The assembler then inserts the pressure sensor circuitry 610 into the opening 135 over the pressure sensor element 760.

In step 1130, the assembler then inserts at least a portion (e.g., rim 820) of the connector component 710 into the hollowed volume 136 over the pressure sensor circuitry. The rim 820 can include a respective detent or impression for acceptance of each of the conductive tabs 640. Insertion of the connector component 710 can include sandwiching the tabs 640 between the rim 820 of connector component 710 and the crimpable wall 160.

In step 1140, the assembler crimps the crimpable wall 160 at the opening 135 to fixedly secure the connector component 710 to the base component 110 and to retain the sensor element 760 within the hollowed volume 136. Crimping of the crimpable wall 160 securely sandwiches the one or more conductive tabs 640 between the rim 820 are the crimp 850.

Figure 11:
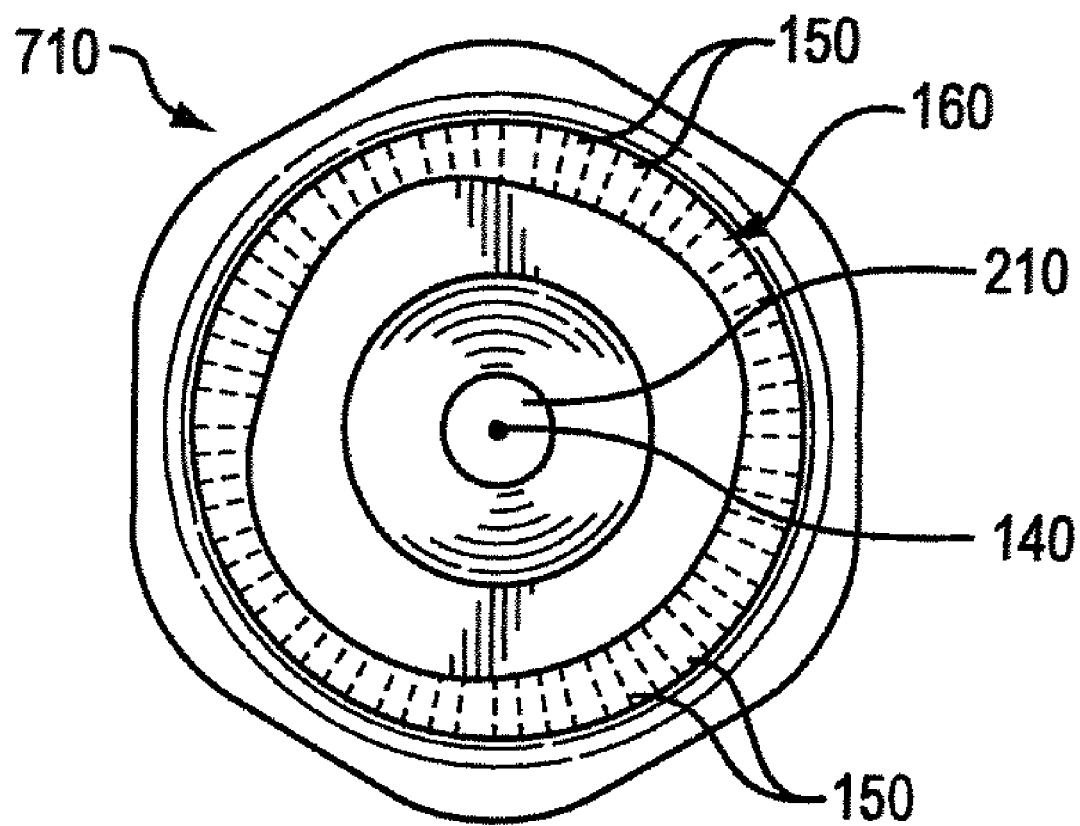
FIG. 11 is an example top view of an opening and hollowed volume in a base component of a pressure sensor assembly after crimping of a respective crimpable wall according to embodiments herein.

FIG. 11 is an example diagram illustrating a top view of the opening of a base component as viewed along axis 140 subsequent to crimping according to embodiments herein.

As previously discussed, and as shown, crimping of the crimpable wall 160 at the opening 135 can cause axial ends of grooves 150 in the grooved surface to point substantially inward towards a rotational axis 140 of the base component 110.

In one embodiment, the grooves 150 prevent rotation of the connector component 710 with respect to the base component 110 such that a mechanic is able to apply a torque to the connector component 110 around axis 140 to screw threads 170 of the base component 110 into a complementary threaded receptacle without damaging the pressure sensor assembly.

Note again that techniques herein are well suited for use in any type of sensor application such as pressure sensor assemblies as discussed herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A pressure sensor assembly comprising:
a pressure sensor element to measure pressure of a fluid;
pressure sensor circuitry coupled to the pressure sensor element to convert the pressure sensed by the pressure sensor element into an electronic signal;
a base component, the base component including a hollowed volume at a first end in which to house the pressure sensor element and the pressure sensor circuitry, the base component including a port at a second end through which to receive the fluid, an inside wall of the first end of the base component including grooves;
a connector component through which to convey the electronic signal from the pressure sensor circuitry to an external resource; and
wherein at least a portion of the first end of the base component including the grooves is crimped inward to fixedly couple the connector component to the base component and retain the pressure sensor electronics and pressure sensor circuitry within the hollowed volume.

2. The pressure sensor assembly as in claim 1, wherein the grooves on the inside wall of the base component prevent rotation of the connector component with respect to the base component.

3. The pressure sensor assembly as in claim 1, wherein second end of the base component includes threads to screwably attach threads disposed at the second end of the base component into a host; and
wherein, prior to being crimped inward, the grooves on the inside wall at the first end of the base component are formed parallel to an axis of rotation to screw the base component into the host.

4. The pressure sensor assembly as in claim 3, wherein the grooves on the inside wall of the base component prevent rotation of the connector component with respect to the base component.

5. The pressure sensor assembly as in claim 1, wherein the pressure sensor circuitry includes conductive material extending from the pressure sensor circuitry and contacting at least a portion of the grooves on the inside wall of the base component.

6. The pressure sensor assembly as in claim 5, wherein the conductive material electrically connects a node of the pressure sensor electronics to the base component.

7. The pressure sensor assembly as in claim 5, wherein the opening and the inside wall are circular and wherein the conductive material in contact with the grooves on the inside wall of the opening is a tab.

8. The pressure sensor assembly as in claim 1, wherein a thickness of the crimped portion of the first end including the grooves is between 0.05 millimeters and 2 millimeters.

9. The pressure sensor assembly as in claim 8, wherein a depth of each of the grooves on the inside wall of the base component is between 2 and 8 millimeters.

10. The pressure sensor assembly as in claim 1, wherein the inward crimping of the first end of the base component causes axial ends of the grooves to point substantially inward towards a center axis of the pressure sensor assembly.

11. The pressure sensor assembly as in claim 1, wherein at least a portion of a grooved surface on the inwardly crimped inside wall of the base component applies a force on a rim of the connector component to secure the connector component to the base component.

12. The pressure sensor assembly as in claim 11 further comprising:
a seal disposed in the hollowed volume; and
wherein the force of the grooved surface on the rim of the connector component produces an fluid tight seal between the pressure sensor element and the base component.

13. The pressure sensor assembly as in claim 12, wherein the pressure sensor circuitry includes conductive material extending from the pressure sensor circuitry to contact at least a portion of the grooved surface on the crimped, inside wall of the base component.

14. The pressure sensor assembly as in claim 13, wherein the conductive material electrically connects a node of the pressure sensor electronics to the base component.

15. A base component of a pressure sensor assembly, the base component including a first end and a second end, the first end including an opening and hollowed volume in which to insert and house a sensor element, an inside wall at the opening of the hollowed volume including a crimpable wall, the crimpable wall having a grooved inner surface, the second end of the base component including threads to screwably attach the base component to a host.

16. The base component as in claim 15, wherein inward crimping of the grooved surface on the inside wall of the opening prevents rotation of a connector component with respect to the base component.

17. The base component as in claim 15, wherein the grooves are formed substantially parallel to an axis of rotation to screw the threads of the base component into the host.

18. A method comprising:
receiving a base component including a first end and a second end, the first end of the base component including an opening and hollowed volume, an inside of a crimpable wall at the opening of the hollowed volume having a grooved surface, the second end of the base component including threads in which to screwably attach the base component to a host; and
inserting a sensor element in the hollowed volume;
inserting at least a portion of a connector component into the hollowed volume; and
crimping the crimpable wall at the opening to fixedly secure the connector component to the base component and to retain the sensor element within the hollowed volume.

19. The method as in claim 18, wherein crimping of the crimpable wall at the opening causes axial ends of grooves in the grooved surface to point substantially inward towards a rotational axis of the base component.

* * * * *